United States Patent [19]

Roe

[11] Patent Number: 4,724,598
[45] Date of Patent: Feb. 16, 1988

[54] METHOD OF BOLT HOLE STRENGTHENING IN A FIBROUS COMPOSITE LAMINATE

[75] Inventor: Richard D. Roe, Wichita, Kans.

[73] Assignee: The Boeing Company, Seattle, Wash.

[21] Appl. No.: 839,590

[22] Filed: Mar. 14, 1986

[51] Int. Cl.⁴ .............................................. B21B 1/46
[52] U.S. Cl. .................................. 29/527.2; 156/293; 427/236
[58] Field of Search ............... 29/527.2; 156/293, 294; 427/236, 422, 427

[56] References Cited

U.S. PATENT DOCUMENTS

| | | | |
|---|---|---|---|
| 3,158,503 | 11/1964 | Young | 29/852 |
| 4,232,496 | 11/1980 | Warkentin . | |
| 4,302,482 | 11/1981 | Heck | 427/236 X |

FOREIGN PATENT DOCUMENTS

| | | |
|---|---|---|
| 1352558 | 5/1974 | United Kingdom . |
| 1455235 | 11/1976 | United Kingdom . |
| 1593483 | 7/1981 | United Kingdom . |

Primary Examiner—Timothy V. Eley
Attorney, Agent, or Firm—Finnegan, Henderson, Farabow, Garrett & Dunner

[57] ABSTRACT

A method of strengthening a bolt hole in a fibrous composite laminate when a hole is drilled in a laminate sheet. The method allows for increased thickness strength, bearing strength and the use of low cost high strength fasteners which may or may not be galvanically compatible through the use of plating the edges of the holes with a metal spray.

1 Claim, 2 Drawing Figures

METHOD OF BOLT HOLE STRENGTHENING IN A FIBROUS COMPOSITE LAMINATE

BACKGROUND OF THE INVENTION

This invention relates to a method of strengthening of a bolt hole and more particularly, but not by way of limitation to a method of strengthening the bolt hole in a fibrous composite laminate.

Heretofore, in the design of fibrous composite parts, ply padups have been required when holes are drilled in laminate sheets. This extra material is required because of reduced allowables due to notch sensitivity of the laminate caused by interlaminar shear stresses around the edges of the bolt holes. These interlaminar shear stresses are a result of edge effects and delamination caused by the relatively low material properties of the "through-the-laminate" direction.

Current methods of suppression of edge effects around bolt holes are through the use of stitching of a B-staged laminate and providing quasi-isotropic padups in the area of the bolt holes. A limitation to this stitching method is that the laminate can only be stitched while B-staged. Once cured, the laminate cannot be altered. Providing quasi-isotropic padups in areas to be bolted works fairly well in increasing laminate bearing strength, but the reduced longitudinal stiffness requires a substantial increase in laminate thickness which is directly related to increased weight.

Further, highly unidirectional composite laminate sheets exhibit poor bolt hole properties such as thickness strength, bearing strength and galvanic corrosion associated with conventional aircraft fasteners.

In the following United States patent, U.S. Pat. Nos. 2,700,172 to Rohe, 3,158,503 to Young, 3,526,072 to Campbell, 3,895,409 to Kwatonowski, 3,977,146 to Wiley, 4,098,922 to Dinella et al, 4,118,855 to Lequeux, 4,232,496 to Warkentin and 4,296,586 to Heurteux various types of fastening devices and grommet assemblies are shown which are used with different types of airframe structures and composite materials. None of these prior art patents point out the distinguishing features of the subject method of bolt hole strengthening as described herein.

SUMMARY OF THE INVENTION

The subject method of bolt hole strengthening in a fibrous composite laminate suppresses edge effects by plating the edges of a laminate bolt holes with a metal compatible with the fiber such as titanium, aluminum and similar metals. The metal plating of the bolt hole provides high strength in the "through the laminate" direction and provides increased bearing strength. The increased strength of the bolt hole allows increased allowables and thus a substantial decrease in the overall weight of a composite aircraft.

The method of bolt hole strengthening of a fibrous composite laminate includes the steps of drilling a hole through the laminate sheet and applying a metal spray by spraying, soldering or electro-plating the sides of the bolt hole. The liquid metal wicks into delamination and fills voids naturally occuring on the edges of fibrous composite laminate. The plating maybe in the range of a few mils thickness or greater for providing a substantial increase in the "through the laminate" strength.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
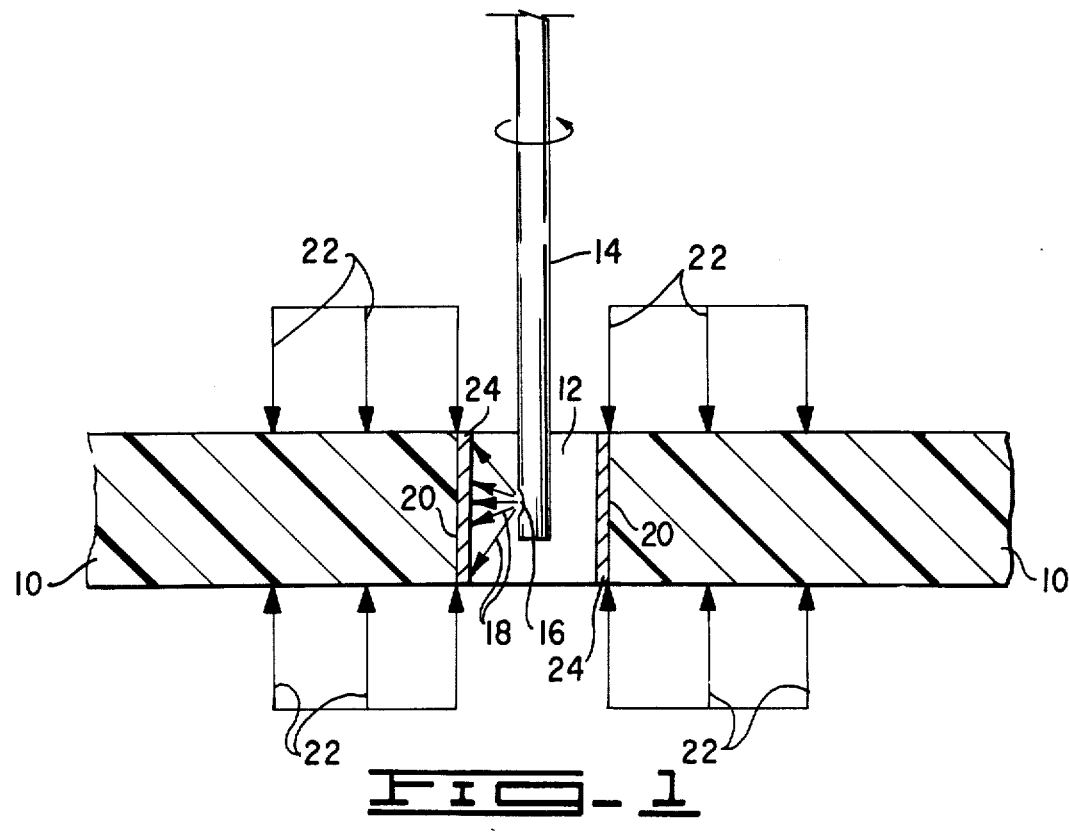
FIG. 1 illustrates the metal spraying of a bolt hole through a laminate sheet.

In FIG. 1 a fibrous composite laminate sheet 10 is shown in cross-section having a drilled hole 12 therethrough. A flame or plasma metal spray applicator 14 having an opening 16 therein is placed inside the hole 12 for introducing a metal spray indicated by arrows 18 to the edges of sides 20 of the bolt hole 12. Also shown in this drawing is the sheet 10 having preloads around hole pheriphery thereon indicated by arrows 22. By preloading the sheet 10 prior to drilling the hole 12 the delamination and voids around the sides 20 of the hole 12 is greatly reduced.

A metal plating 24 of the bolt hole 12 can be accomplished by a number of methods such as flame spraying, soldering, electro-plating and similar types of applications. The liquid metal 18 wicks into delamination and voids naturally occuring along the edges of the sides 20 of hole 12. The metal plating 24 or reinforcement may be in a thickness in the range of 0.002 to 0.02 inches for providing a substantial increase in the "through-the-laminate" strength.

Figure 2:
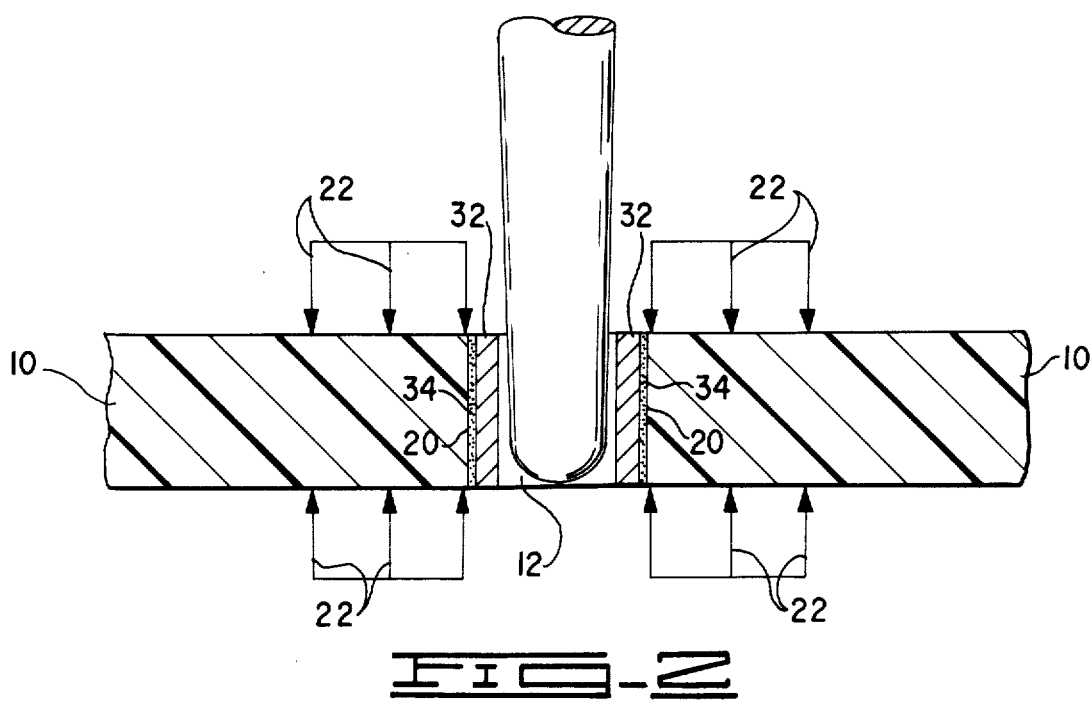
FIG. 2 illustrates an alternate embodiment of the invention by applying a heated mandrel inside the bolt hole adjacent a metal liner having a B-stage adhesive around the pheriphery of the bolt hole.

In FIG. 2 an alternate embodiment of the method of the invention is shown using a heated mandrel 30 inserted in the hole 12 of the composite laminate sheet 10. The sheet 10 is also under a preload indicated by arrows 22. In this embodiment a metal liner 32 is introduced with a B-stage adhesive 34 introduced between the liner 32 and the sides 20 of the hole 12. The heated mandrel 30 heats and expands the metal liner 32 and through conduction, the adhesive 34 is heated and adheres to the sides 34 of the hole 12 for providing a bonded metal liner therein.

Changes may be made in the construction and arrangement of the parts or elements of the embodiments as described herein without departing from the spirit or scope of the invention defined in the following claims.

What is claimed is:

1. A method of strengthening a bolt hole in a fibrous composite laminate sheet, the steps including:
   drilling a hole through a composite laminate sheet;
   applying an adhesive around the sides of the hole;
   inserting a metal liner inside the hole adjacent the adhesive; and
   applying a heated mandrel inside the hole and adjacent the inner circumference of the metal liner and heating and forming an adhesive bond between the liner and the sides of the hole.

* * * * *

UNITED STATES PATENT AND TRADEMARK OFFICE
CERTIFICATE OF CORRECTION

PATENT NO. : 4,724,598

DATED : FEBRUARY 16, 1988

INVENTOR(S) : RICHARD D. ROE

It is certified that error appears in the above-identified patent and that said Letters Patent is hereby corrected as shown below:

Column 1, line 51, "titamium" should be --titanium--.

Signed and Sealed this

Twenty-eighth Day of June, 1988

Attest:

DONALD J. QUIGG

Attesting Officer      Commissioner of Patents and Trademarks